United States Patent [19]

Koyano et al.

[11] 4,052,039
[45] Oct. 4, 1977

[54] AUTOMATIC CUTTING TORCH ASSEMBLY

[75] Inventors: Nobushige Koyano, Kanagawa; Katsumi Inamori, Aichi, both of Japan

[73] Assignees: Iwatani Sangyo Kabushiki Kaisha, Osaka; Seimitsu Yodanki Kabushiki Kaisha, Tokyo, both of Japan

[21] Appl. No.: 742,641

[22] Filed: Nov. 17, 1976

[30] Foreign Application Priority Data

May 19, 1976 Japan .................................. 51-64146

[51] Int. Cl.$^2$ .............................................. B23K 7/10
[52] U.S. Cl. ......................................... 266/57; 148/9.6; 219/60 R; 219/125 R; 219/125 PL; 266/60
[58] Field of Search .................. 148/9 R, 9.6; 266/57, 266/60, 54; 219/60 R, 124, 125 R, 125 PL

[56] References Cited

U.S. PATENT DOCUMENTS

| 3,430,938 | 3/1969 | Blackburn | 266/57 |
| 3,704,373 | 11/1972 | Bardwell et al. | 266/60 X |
| 3,936,714 | 2/1976 | Marshall et al. | 266/60 X |

FOREIGN PATENT DOCUMENTS

| 341,615 | 3/1972 | U.S.S.R. | 148/9.6 |

Primary Examiner—Roy Lake
Assistant Examiner—Paul A. Bell

[57] ABSTRACT

The invention relates to an automatic cutting torch assembly for making cuts of any predetermined shape in a metallic pipe. Rollers are provided for the pipe to be processed which permit back and forth movement of the pipe. A photoelectric tracer unit and a cutting torch are mounted on a longitudinally extending bar which is also movable back and forth. The tracer unit and cutting torch are aligned with the axis of the pipe and are adjustable so as to be brought in close proximity to the pipe regardless of the size of the pipe. A pattern line is placed on the pipe and the tracking of the line by the tracer unit results in providing the correct cutting locus for the torch. A resolver unit senses the instantaneous angular position of the tracer unit and translates the sensed signal into two signals which correspond to the circumferential and angular components of the sensed angular position. The circumferential component signal is transmitted to a first servomotor which effects rotation of the pipe in either direction, as required, and the axial component signal is transmitted to a second servomotor which effects back and forth movement, as required of the beam which carries the cutting torch and the tracer unit. The two servomotors acting simultaneously cooperate so that the locus of the cutting torch is a replica of the tracked pattern line.

1 Claim, 4 Drawing Figures

AUTOMATIC CUTTING TORCH ASSEMBLY

The invention relates to a new and improved cutting torch assembly for making one or more cuts of any predetermined shape in a metallic pipe.

In all forms of pipe cutting operations there are two components of relative movement involved which are the axial and rotational movements of the torch relative to the pipe. In prior art pipe cutting machines the rotational component is performed with chucks which rotate the pipe while the pipe is being cut by the cutting torch. Chucks used for this purpose give rise to many disadvantages, however, such as alignment problems and also causing physical damage to pipes made of relatively thin sheets of metal.

In the present invention a new and improved way is provided for providing the two components of relative motion without the use of chucks. This results in an improved and more efficient way of providing the required relative movement from the standpoint that the apparatus is simpler and the set-up for each pipe to be processed is simpler and faster.

It is therefore a main object of the invention to provide a new and improved pipe cutting torch assembly of the type described and having the advantages described.

Other objects and advantages of the invention will become apparent from the following specification, drawings and appended claims.

Figure 1:
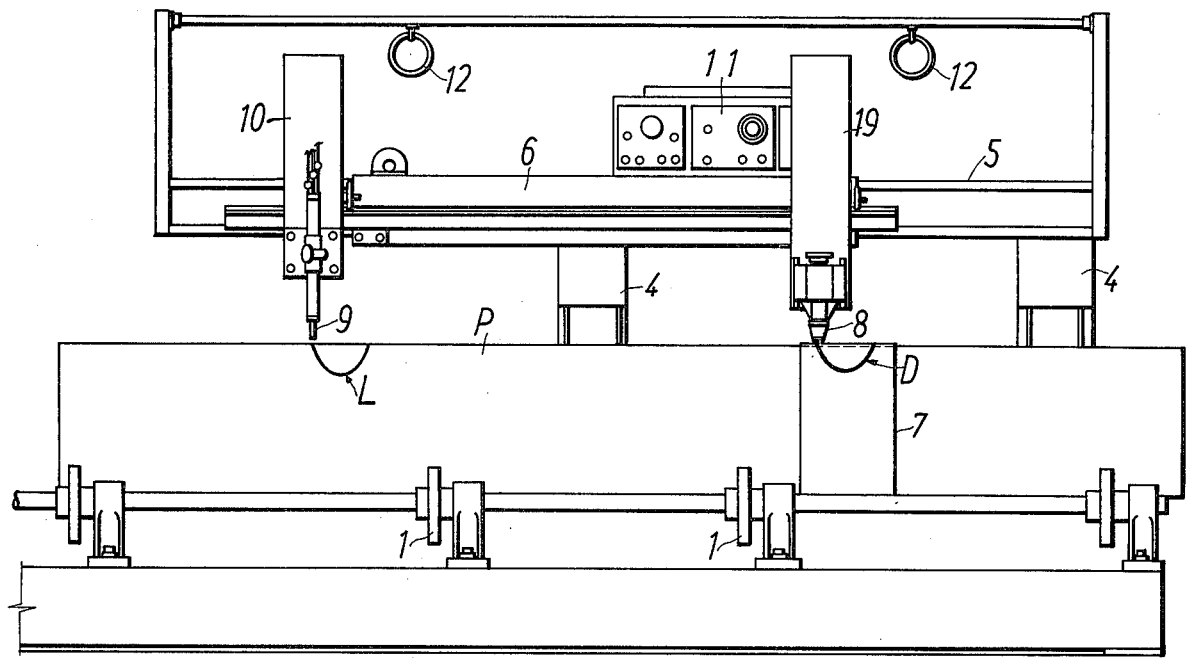
FIG. 1 is a front elevational view of an automatic gas flame cutting apparatus for cutting metal pipes which embodies the invention.
Figure 2:
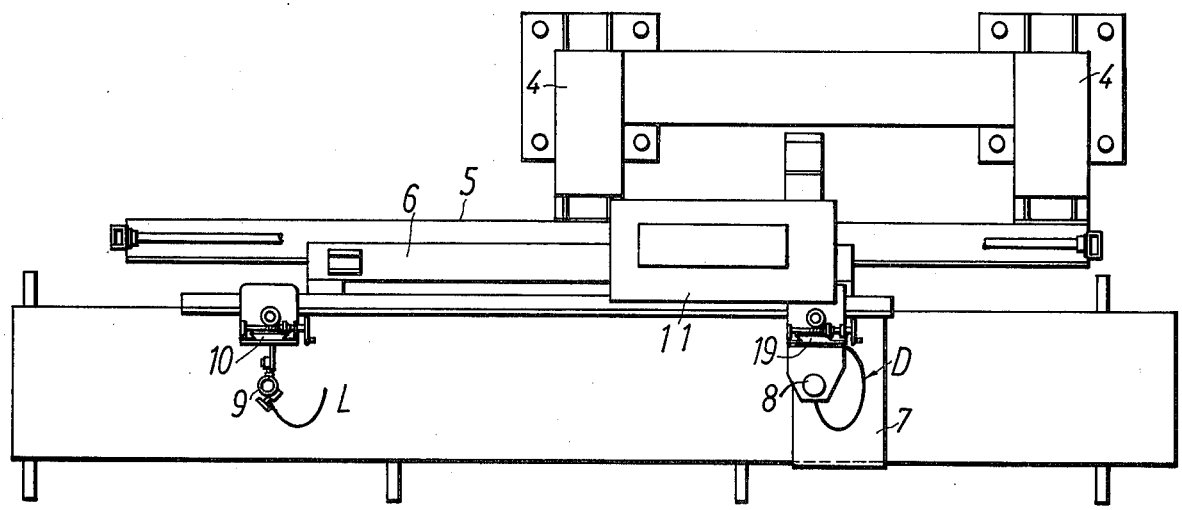
FIG. 2 is a top view of the apparatus shown in FIG. 1.
Figure 3:
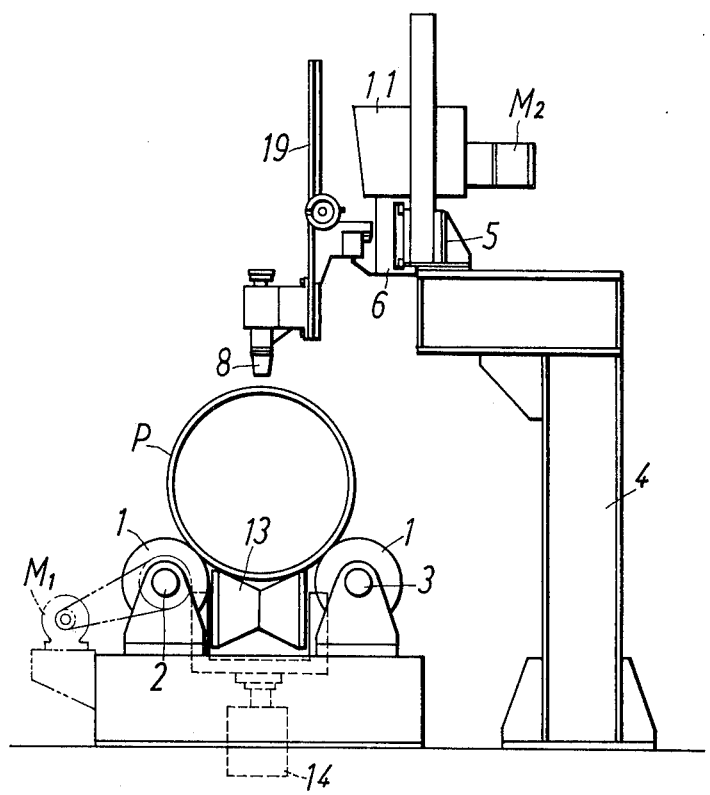
FIG. 3 is a side view of the appartus shown in FIG. 1, from the right side thereof.
Figure 4:
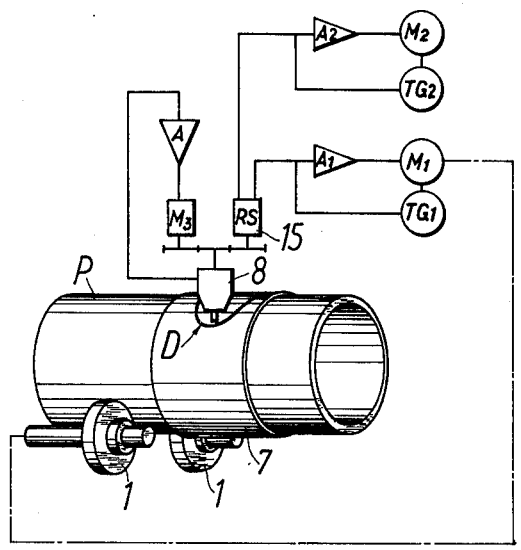
FIG. 4 is a fragmentary, partly perspective and partly schematic view of the electrical control system of the apparatus shown in FIG. 1.

With reference to the drawings, the apparatus includes a base frame upon which two shafts 2 and 3 are rotatably mounted in transversely spaced relation. A plurality of rollers or disks 1 are attached to shafts 2 and 3 at spaced apart points longitudinally thereof. A pipe P upon which a cutting operation is performed is supported on the disks 1.

Several rollers 13 (only one of which is shown) are provided for transporting pipe P, which may be too heavy to be moved manually, to and away from the position where it is supported by the disks 1. Rollers 13 are raised and lowered by jacks 14, only one of which is shown. This roller and jack system is not part of the invention although it implements the operation of the other apparatus.

An electrically driven servomotor M1 is mounted on the base frame and is connected in driving relation to the rotatable shaft 2 for driving it in either direction. When a pipe P is mounted on the disks 1, the rotation of shaft 2 by servomotor M1 causes the pipe to rotate in the opposite direction. The rotation of the pipe P is accommodated by the rotation of shaft 3 and the disks attached thereto.

On one side of the base frame which supports shafts 2 and 3 is a frame structure 4 which includes two vertically extending pillars and a horizontally extending girder. Attached to the girder frame structure 4 is a horizontally extending rail member 5. A movable beam 6 cooperates with the rail member 5 so as to be supported thereby and be movable relative thereto.

An electric servomotor M2 mounted on the girder of the frame structure 4 is connected to the movable beam 6 through drive means (not shown) to effect back and forth movement of the beam 6 relative to the rail member 5.

Adjustably attached to the movable beam 6 are two vertically extending guide rails 10 and 19. Manual means for attaching guide rails 10 and 19 at desired points along beam 6 are not shown.

Attached to guide rail 10 is a cutting torch unit 9 which is vertically adjustable relative to the guide rail 10 by manual means which are not shown. Similarly, there is attached to rail 19 a photoelectric tracer unit 8 which is vertically adjustable relative to guide 19 by manual means which are not shown.

The locus L of the cut to be made in or on pipe P by the cutting torch 9 is determined by a selected line pattern D which is in some convenient way made to appear on the pipe. The pattern D may be drawn directly on the pipe or, as illustrated, may be drawn on a sheet of paper 7 which is affixed to the pipe.

The cutting along the locus L by torch 9 is controlled by conrol apparatus contained in a control box 11 which is preferrably mounted on the movable beam 6 but which could be mounted elsewhere. In the operation of the apparatus the set-up procedure involves positioning the torch 9 and tracer unit 8 relative to the beam 6, and the placement of the pattern D on the pipe, so that the locus L corresponds to the desired cut. The set-up procedure also involves setting the torch 9 and the tracer head 8 in closely spaced, nontouching relation to pipe P.

The photoelectric head 8 senses the pattern D. The control means functions to allow the head to trace the pattern by operating the servomotor M1 to rotate the pipe P alternately in opposite directions for the circumferential trace component and by operating the servomotor M2 to move the beam 6 to and fro for the axial trace component.

The photoelectric head 8 may be of a known type having three electric eyes which facilitate the tracking of a line such as the pattern line D. In tracking the line D the head 8 must continually turn about a vertical axis, first in one direction and then the other, and this turning is effected by a servomotor M3 which itself is controlled by amplified signals generated by the sensing function of the head 8.

The above referred to turning of the head 8 results in the head 8 having at each instant an angular position which corresponds to the direction of a small segment of the line D in which the head is in close proximity at that instant. The instantaneous angular position of the head 8 is sensed by a resolver unit 15 which is an analog device which translates the angular position into two signals which correspond to circumferential and axial components of the sensed angular position. The two signals are amplified and transmitted to the servomotors M1 and M2, respectively.

The servomotors M1 and M2 are in this way caused to operate simultaneously to rotate the pipe P and axially move the beam 6 so that there is no appreciable deviation in connection with the tracking of pattern line D by tracer head 8.

Units TG1 and TG2 are known types of governors which control the rotating speed of the servomotors M1 and M2 but which are not essential parts of the invention.

The cutting torch 9 may be of any known type which is appropriate such as the oxyacetylene oxyhydrogen type. There is a precise master and slave relationship between the translatory motions of the photoelectric head 8 and the cutting torch 9, relative to the pipe P, which results in the cutting locus L being an axact replica of the pattern line D.

Rings 12 mounted on the frame structure 4 are provided for holding gas hoses and electrical cables in a convenient and orderly manner.

Although not shown, it is apparent that multiple cutting operations could be achieved by attaching additional guide rails and torches to the beam 6. In this way there could be multiple cuts of identical shape at longitudinally spaced points along the pipe P.

We claim:

1. An automatic cutting torch assembly for making a cut of any predetermined shape in a metallic pipe upon which a pattern line has been superimposed which is a replica of said predetermined shape, comprising, frame means, first and second shafts rotatably mounted on said frame means in transversely spaced relation, disk means attached to said shafts at spaced apart points longutidinally thereof for supporting said pipe, a first servomotor mounted on said frame means in driving relation to one of said shafts for rotating said pipe in either selected direction, longitudinally extending rail means mounted on said frame means in parallel relation to said pipe, a beam member mounted on said rail means for movement relative thereto and parallel to said pipe, a second servomotor mounted on said frame means in driving relation to said beam member for moving said beam member in either selected direction, a rotatable photoelectric tracer unit for sensing and tracking said pattern line mounted on said beam member for rotation about an axis which is perpendicular to and intersects the horizontal axis of said pipe, a third servomotor carried by said beam member and being responsive to conditions sensed by said tracer unit, said third servomotor being in driving relation with said tracer unit for rotating said tracer unit in either selected direction to perform said tracking, a cutting torch unit mounted on said beam member and directed towards said pipe so that the axis thereof is parallel to the axis of said tracer unit and intersects the axis of said pipe, at least one of said units being adjustably positioned on said beam member so that the distance between said units may be selected during set-up, a resolver unit for sensing the instantaneous angular position of said tracer unit and translating the second signal into two signals which correspond to circumferential and axial components of said sensed angular position, means for transmitting said transmitted two signals to said first and second servomotors to simultaneously rotate said pipe and move said beam member axially so that the locus of said cutting torch is a replica of said tracked pattern line.

* * * * *